(12) United States Patent
Conti et al.

(10) Patent No.: US 8,289,842 B2
(45) Date of Patent: Oct. 16, 2012

(54) BRIDGING INFRASTRUCTURE FOR MESSAGE FLOWS

(75) Inventors: Robert J. Conti, Weymouth, MA (US); Christopher E. Khoury, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/651,660

(22) Filed: Jan. 4, 2010

(65) Prior Publication Data
US 2011/0164495 A1    Jul. 7, 2011

(51) Int. Cl.
*H04L 1/00* (2006.01)
(52) U.S. Cl. .................................................. 370/220
(58) Field of Classification Search .......... 370/216–228, 370/237–238, 400–401
See application file for complete search history.

(56) References Cited

U.S. PATENT DOCUMENTS

| | | | |
|---|---|---|---|
| 6,625,117 B1 * | 9/2003 | Chen et al. ..................... 370/227 |
| 6,996,502 B2 * | 2/2006 | De La Cruz et al. .......... 702/188 |
| 7,152,182 B2 | 12/2006 | Ji et al. | |
| 7,178,055 B2 | 2/2007 | Ji et al. | |
| 7,571,343 B1 | 8/2009 | Xiang et al. | |
| 7,613,747 B1 * | 11/2009 | Thakur et al. ................. 707/640 |
| 7,802,137 B2 * | 9/2010 | Kawamura et al. ............. 714/20 |
| 2006/0159012 A1 * | 7/2006 | Yoshimoto et al. ........... 370/220 |
| 2008/0046400 A1 * | 2/2008 | Shi et al. ............................ 707/2 |
| 2010/0325485 A1 * | 12/2010 | Kamath et al. ................... 714/15 |

OTHER PUBLICATIONS

Alcott et al, Failover and Recovery in WebSphere Application Server Advanced Edition 4.0, 113 pages, Dec. 2001.*
Li Ou, et al., "Symmetric Active/Active Metadata Service for Highly Available Cluster Storage Systems", Proceedings of the 19th IASTED International Conference on Parallel and Distributed Computing and Networks. 2007, Acta Press, 6 pages.

* cited by examiner

*Primary Examiner* — Frank Duong
(74) *Attorney, Agent, or Firm* — Andrea Bauer; Hoffman Warnick LLC

(57) ABSTRACT

A system, method and program product for proving a bridging infrastructure for handing failover situations using complimentary appliances. Each appliance includes: a first primary gateway configured for communicating a first message flow; a standby gateway configured for communicating a second message flow, wherein the standby gateway is placed in a standby mode during normal operations; and a controller service that monitors a complimentary appliance having a second primary gateway for communicating the second message flow, wherein upon a detected failure of the complimentary appliance, the controller service causes the second message flow to be redirected through the standby gateway.

20 Claims, 5 Drawing Sheets

BRIDGING INFRASTRUCTURE FOR MESSAGE FLOWS

FIELD OF THE INVENTION

This disclosure is related generally to solutions for integrating heterogeneous message queuing systems, and is more particularly related to a bridging infrastructure and method for bridging message queuing systems using pairs of physical appliances to provide failover management.

BACKGROUND OF THE INVENTION

In complex information technology environments, it is often necessary to integrate heterogeneous message queuing systems that service a myriad of business applications. For instance, a first application may have a message queuing system that needs to communicate messages with a message queuing system of a second application. In the case where the two messaging system utilize heterogeneous formats or protocols, a bridge is required to ensure that the messages are reliably delivered, properly processed, sequenced, etc.

One of the challenges of implementing a bridge is handling failover situations, in which the bridge temporarily fails or one or more endpoints in a message queuing system fail. In such situations, it is imperative that the failure can be addressed in such a manner that preserves the integrity of the message flows and messages themselves, overall quality of service the system provides, sequencing of the messages associated with one or more flows, etc.

Current approaches involve the use of shared storage and/or replication software that typically requires changes at the server level of each message queuing system. A major drawback to this solution is the high levels of both upfront and ongoing administrative costs to ensure that such changes, which represent other possible points of failure, are configured, monitored and maintained properly. A second known solution entails the use of an "exclusive queue" configuration within the message queuing systems. This approach, while plausible in some environments, typically imposes higher degrees of overhead and inefficiencies that result in lower levels of performance.

SUMMARY OF THE INVENTION

The present invention provides a standalone bridging infrastructure that sits between two or more messaging queuing systems. More particularly, two "stateless" physical appliances are implemented without hard disks or replication software to process messages between message queuing systems without message or sequence loss in the event of a single appliance failure. The appliances are fully automated, provide capabilities for integration with administrative monitoring systems, and provide maximum physical asset utilization through peer monitoring across the appliance pool. The solution is self-contained, automated and obviates the need for the purchase and maintenance of additional infrastructure and software components that are typically required to address the same problem in other bridging infrastructure solutions. In addition, little to no performance penalty is incurred.

In one embodiment, there is a bridging infrastructure for bridging message flows between two messaging systems, comprising: a current appliance, comprising: a first primary gateway configured for communicating a first message flow; and a first standby gateway configured for communicating a second message flow, wherein the first standby gateway is implemented in a standby mode during normal operations; a complimentary appliance, comprising: a second primary gateway configured for communicating the second message flow; and a second standby gateway configured for communicating the first message flow, wherein the second standby gateway is implemented in a standby mode during normal operations; wherein both the current appliance and the complimentary appliance include a controller service that monitors the operation of each other; and wherein upon a detected failure of the complimentary appliance by the current appliance, the controller service on the current appliance causes the second message flow on the primary gateway of the complimentary appliance to be redirected through the standby gateway of the current appliance.

In a second embodiment, there is an appliance for bridging message flows between two messaging systems, comprising: a first primary gateway configured for communicating a first message flow; a standby gateway configured for communicating a second message flow, wherein the standby gateway is placed in a standby mode during normal operations; and a controller service that monitors a complimentary appliance having a second primary gateway for communicating the second message flow, wherein upon a detected failure of the complimentary appliance, the controller service causes the second message flow to be redirected through the standby gateway.

In a third embodiment, there is a method for bridging message flows between two messaging systems, comprising: providing a pair of appliances, wherein: a current appliance includes a primary gateway configured for communicating a first message flow, and includes a standby gateway placed in a standby mode for communicating a second message flow; and a complimentary appliance includes a primary gateway configured for communicating the second message flow, and includes a standby gateway set in a standby mode for communicating the first message flow; monitoring an operation of the complimentary appliance from the current appliance; upon a detected failure, routing a message flow from the primary gateway of the complimentary appliance to the standby gateway of the current appliance.

In a fourth embodiment, there is a computer readable storage medium having a program product, which when executed by a first computer system, bridges message flows between two messaging systems, comprising: program code for providing a first primary gateway configured for communicating a first message flow; program code for providing a standby gateway configured for communicating a second message flow, wherein the standby gateway is placed in a standby mode during normal operations; and program code that monitors a complimentary computer system having a second primary gateway for communicating the second message flow, wherein upon a detected failure of the complimentary appliance, the program code that monitors causes the second message flow to be redirected through the standby gateway.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
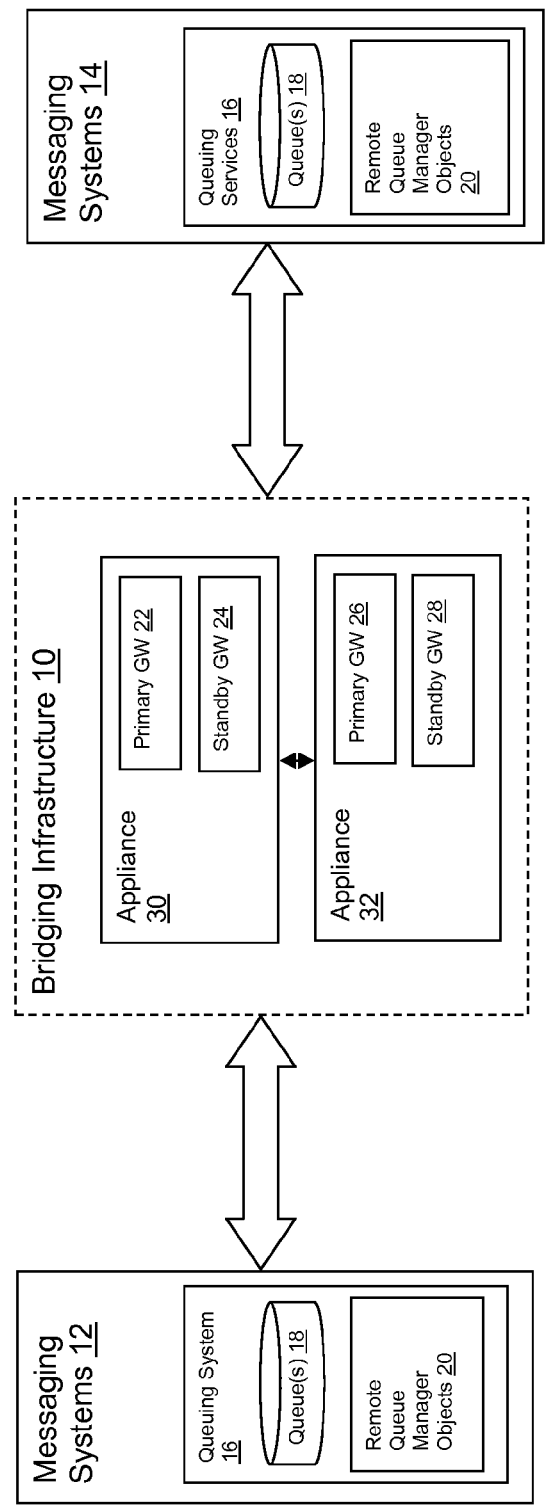
FIG. 1 depicts a bridging infrastructure in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

FIG. 1 depicts an illustrative bridging infrastructure 10 for handling message flows between two (or more) messaging systems 12, 14. Messaging systems 12, 14 may for example comprise a messaging middleware system such as IBM WEBSPHERE MQ™. Messaging systems 12, 14 generally include a queuing system 16 that includes one or more queues 18 and remote queue manager objects 20 that allow queues 18 to be remotely managed from the bridging infrastructure 10. In particular, remote queue manager objects may be implemented through the use of a custom service that allows "rolling back" of messages to a source queue where there is doubt that the message was successfully transferred to a destination queue (i.e., message "in-doubt" handling).

Bridging infrastructure 10 is implemented with two physical appliances 30, 32. Each appliance 30, 32 may be implemented in any manner, e.g., as a custom hardware/software device, as a general purpose computer system having specialized software, etc. On each physical appliance 30, 32, a single application domain hosts two gateway (GW) services configured with queue-based front-side and back-side handlers. Each of the two gateway services running in the application domain are designated primary or standby, with a clone of each running on a second physical appliance, deployed as the inverse of the first appliance, thus backing each other up via a duplex paradigm.

In this case, appliance 30 includes a primary gateway 22 and a standby gateway 24, and appliance 32 includes a primary gateway 26 and a standby gateway 28. During normal operations, primary gateway 22 on appliance 30 would for example handle a first message flow between a first pair of applications and primary gateway 26 on appliance 32 would for example handle a second message flow between a second pair of applications. As long as both appliances 30, 32 were operating normally, the two standby gateways 24, 28 would be in a non-active standby mode. If however, one of the appliances were to fail, then its message flow would be routed through the standby gateway of the other, i.e., "complimentary," appliance. For instance, if appliance 30 failed, then the message flow going through primary gateway 22 would be routed to the standby gateway 28 of appliance 32.

Figure 2:
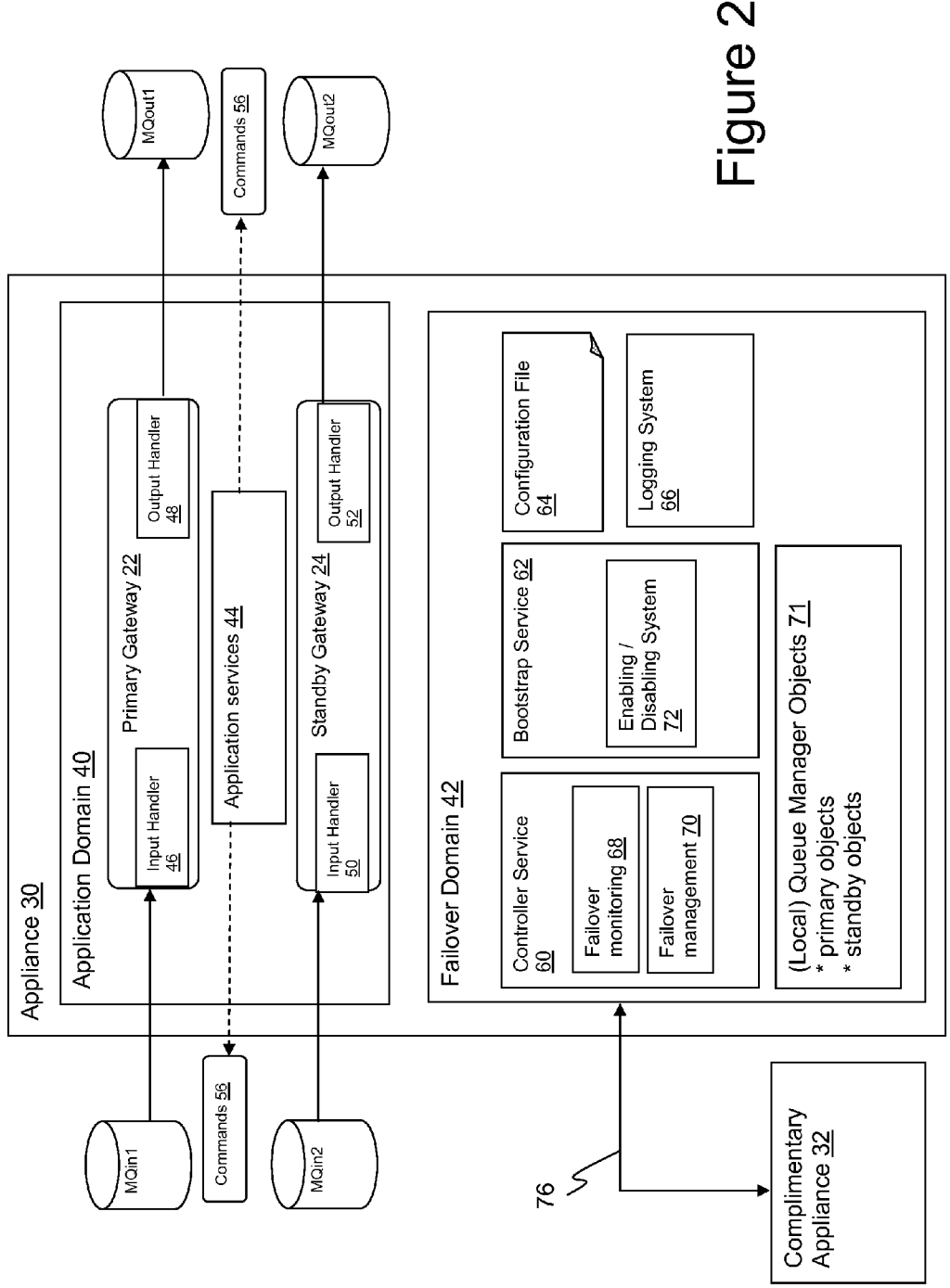
FIG. 2 depicts an appliance in accordance with an embodiment of the present invention.

FIG. 2 depicts a more detailed view of appliance 30. In this illustrative embodiment, appliance 30 is implemented using an application domain 40 and a failover domain 42. Application domain 40 includes primary gateway 22 and standby gateway 24, each having an input handler 46, 50 and an output handler 48, 52. Primary gateway 22 is configured to consume messages from queue MQin1 and output messages to queue MQout1. Standby gateway 24 is configured to consume messages from queue MQin2 and output messages to queue MQout2. Complimentary appliance 32 is configured in the opposite manner, i.e., its primary gateway is configured to consume messages from queue MQin2 and output messages to queue MQout2 and its standby gateway is configured to consume messages from queue MQin1 and output messages to queue MQout1.

Application services 44 manage the various gateway services, policies, etc., of both the primary and standby gateways 22, 24. Application services 44 include the capability of sending commands 56 to associated remote queue manager objects 20 (FIG. 1) as needed.

Failover domain 42 includes a controller service 60, a bootstrap service 62, a configuration file 64 and a logging system 66. Controller service 60 includes failover monitoring 68, which monitors the gateways of appliance 30 and the controller service of complimentary appliance 32; and failover management 70, which manages the procedures for handling a detected failed gateway, including redirecting message flows to the standby gateway 24 if a primary gateway of a complimentary appliance 32 fails.

As noted, failover domain 42 operates in a separate domain from application domain 40, so as not to interfere with message processing. To implement separate domains, failover monitoring 68 and failover management 70 may be scoped at the 'Q' object level, out of scope from the objects implemented by application domain 40. This simplifies the solution and reduces the amount of processing required to effectively perform failover.

An XML management interface may be utilized as the primary interface for monitoring Q based objects, as well as for performing failover management 70 related to the starting and stopping of services. SOAP/HTTPS may be utilized as the primary data format and wire protocol to communicate between appliances 30, 32.

Bootstrap service 62 is responsible for appliance recovery and recalibration, and is only run once at appliance startup or when enabled by the complimentary controller service during certain failover situations. For proper operation of all failover scenarios, all remote queue manager objects 20 (FIG. 1) should be disabled by default so nothing is active when an appliance is started. Based on the configuration file 64, bootstrap service 62 performs the following:

1. Disables all (local) primary queue manager objects 71 (i.e., the gateway and application services that are active or non-standby).
2. Makes sure queuing system 16 (FIG. 1) rolls back any in-doubt messages.
3. Disables all primary queue manager objects on the complimentary appliance 32.
4. Enables all primary queue manager objects 71 on the current appliance 30.
5. Enables the controller service 60 on the current appliance 30.
6. Disables self.

The configuration file 64 is utilized by both the bootstrap service 62 and the controller service 60 to configure appliance 30 for the appropriate objects and required IP addresses.

The controller service 60 is responsible for runtime management of both its primary queue manager objects 71 as defined in the configuration file 64, as well as performing a heartbeat or checks against primary queue manager objects, as defined by the configuration file 64, on a complimentary appliance 32. Queue manager objects 71 are essentially local client objects that connect to the remote queue manager objects 20 in queuing system 16 (FIG. 1). Controller service 60 is bootstrapped by the bootstrap service 62 and runs continuously in the failover domain 42 as a scheduled rule at a user-defined interval.

Briefly, the controller service 60 performs the following sequence of events per iteration:

1. Read in the configuration file 64.
2. Check local primary queue manager objects 71 on current appliance 30.
3. If operational state is down, perform a shutdown on all remaining local primary queue manager objects 71.
4. Check primary queue manager objects on complimentary appliance 32.
5. If complimentary primary queue manager objects' operational state is down, check if any local standby queue manager objects 71 are in an operational state.
6. If operational state is down, perform the necessary in-doubt resolution handling, followed by the start-up of the corresponding local standby queue manager object(s); if operational state is up, take no action and exit.
7. A new iteration of the controller service 60 will then be invoked as per its next user-defined interval.

Logging system 66 generates a log to track failover activities. Logging system 66 allows one to filter on various log events generated by services running in the failover domain. These events can be re-directed to a centralized logging system such as a system log for a unified view of real-time failover events.

Figure 3:
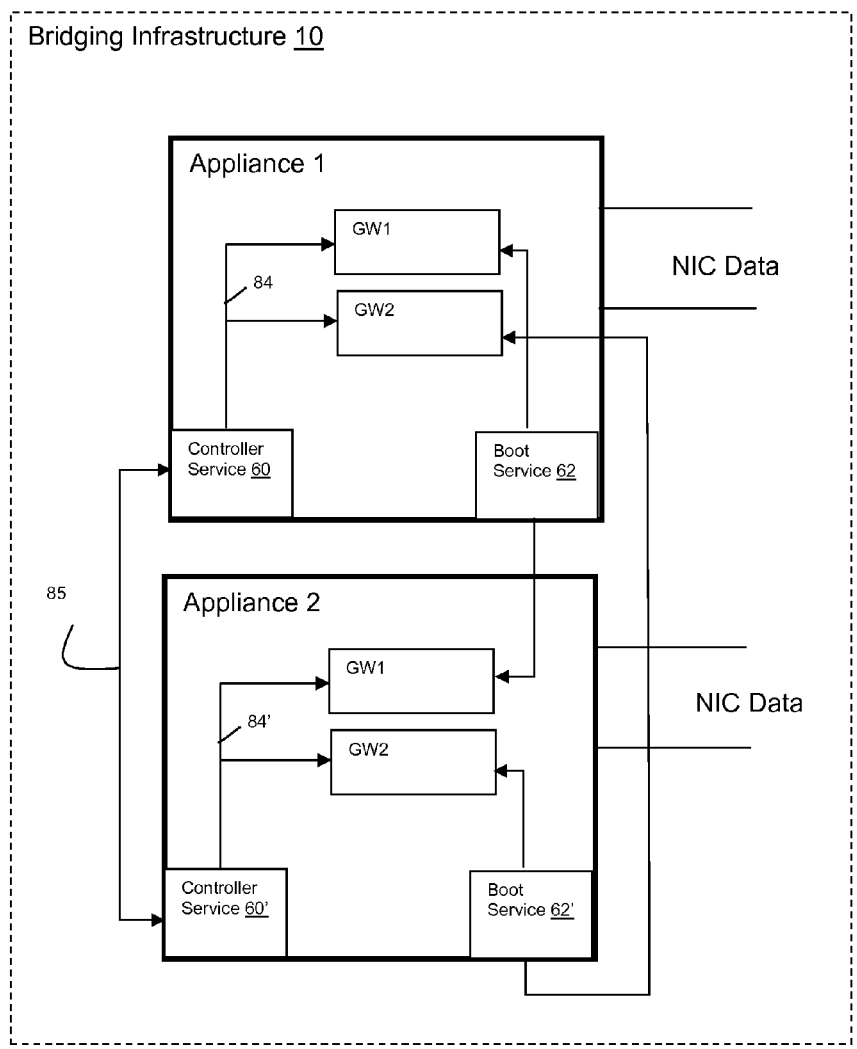
FIG. 3 depicts monitoring paths in an appliance pair in accordance with an embodiment of the invention.

FIG. 3 depicts a general overview of the communication between appliance 1 and 2 within bridging infrastructure 10. In this example, GW1 is set up as the primary gateway on appliance 1, and GW2 is set up as the primary gateway on appliance 2. As can be seen, each controller service 60, 60' is responsible for monitoring 84, 84' their own primary and standby gateways (GW1, GW2). In addition, each controller service 60, 60' is responsible for monitoring 85 each other. Each boot service 62, 62' is responsible for enabling and disabling its primary gateway and the standby gateway of the complimentary device.

Figure 4:
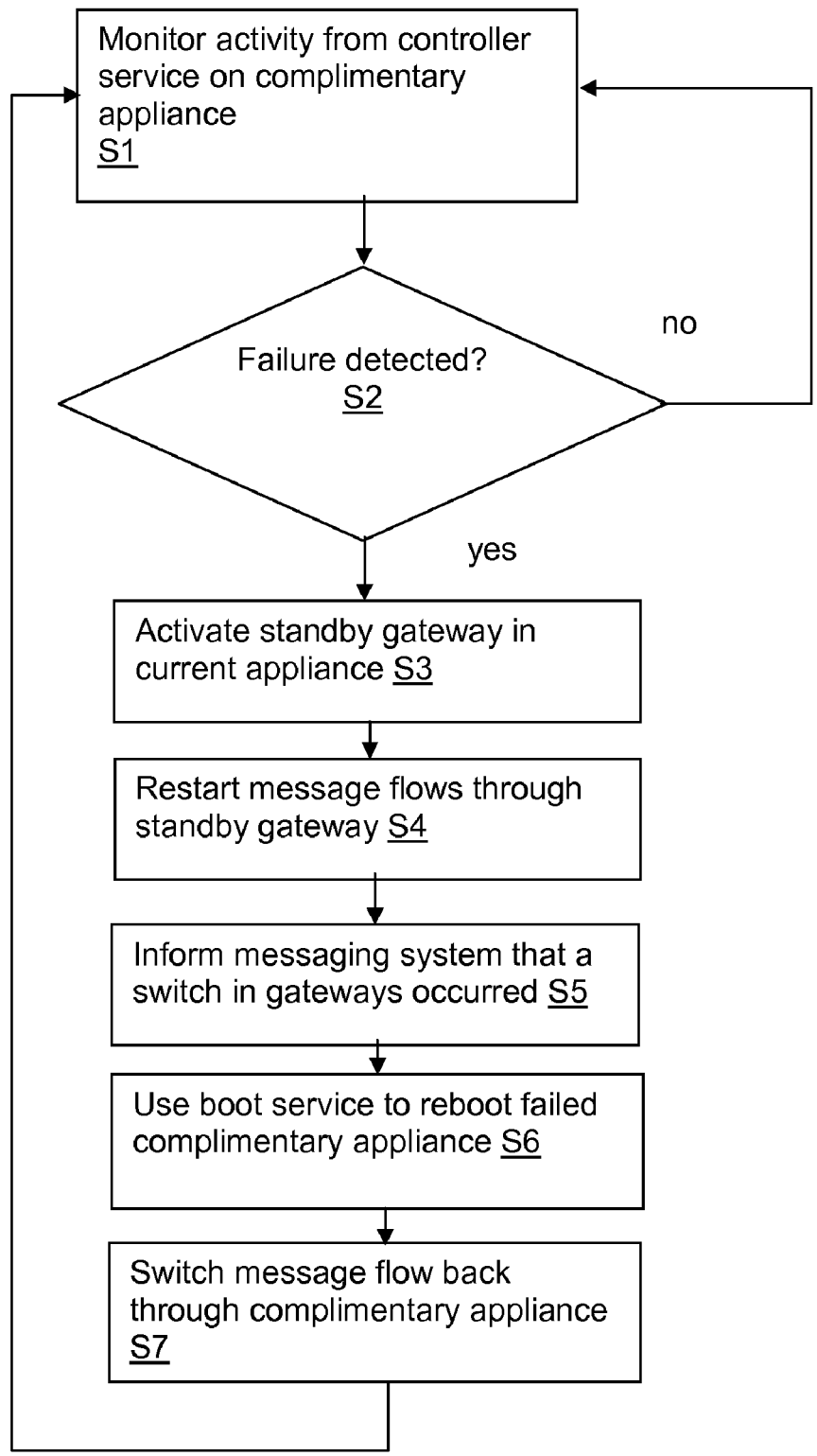
FIG. 4 depicts a flow diagram of an operation of an appliance in accordance with an embodiment of the invention.

FIG. 4 depicts a flow diagram of an illustrative operational process for handling a failover from the perspective of a current appliance. At S1, the controller service of the current appliance monitors the activity from the controller service on a complimentary appliance. At S2, a determination is made whether or not a failure was detected. If no, control loops back to S1 for further monitoring. If yes, the standby gateway is activated in the current appliance at S3 and message flows from the failed appliance are restarted through the standby gateway at S4. At S5, the messaging system is informed that a failover situation occurred. The messaging system can then take the appropriate action to ensure that no messages were lost. At S6, the boot service on the current appliance is launched to reboot the failed complimentary appliance. Once the failed complimentary appliance is back up and running, message flows are switched back through the primary gateway on the complimentary appliance.

Figure 5:
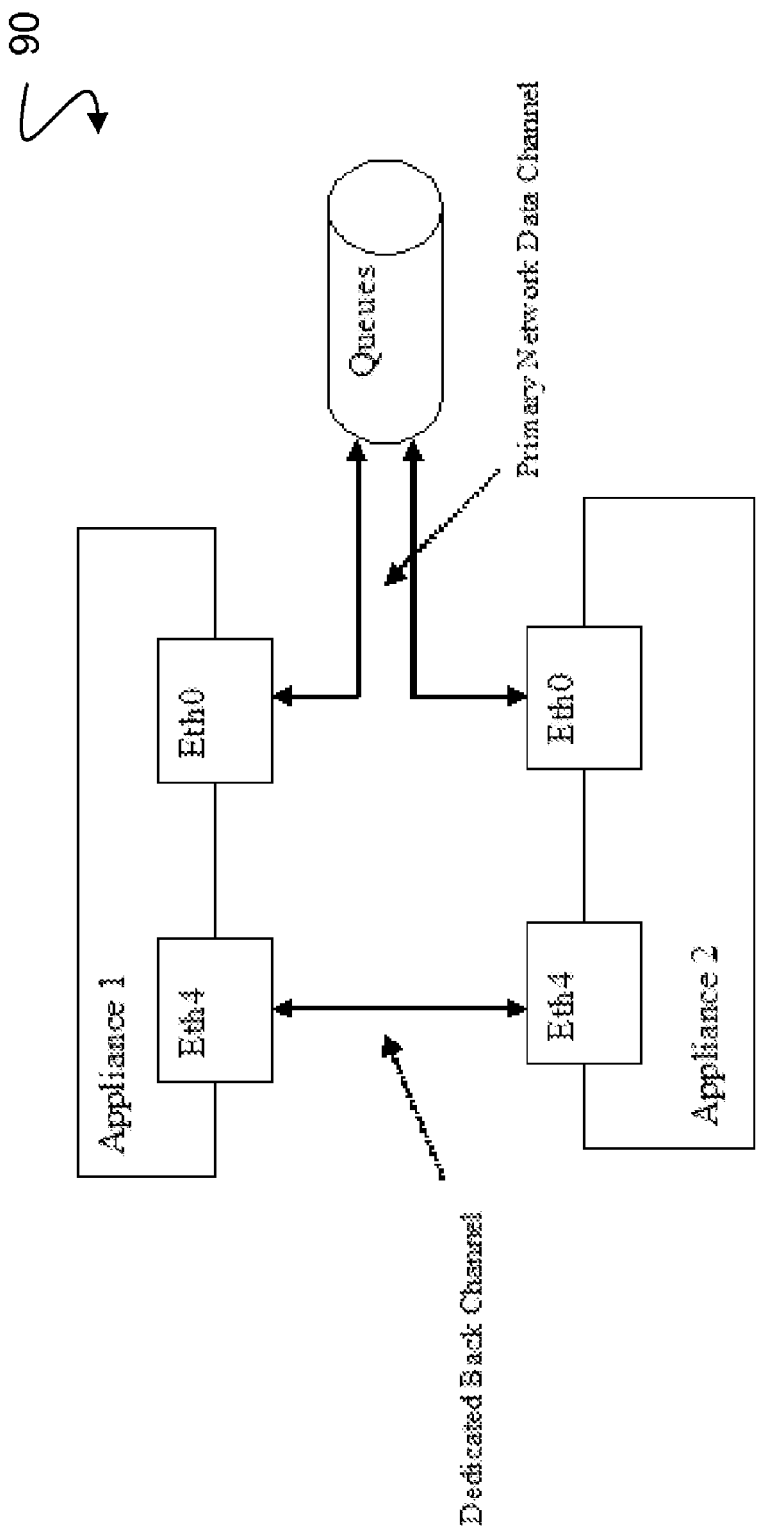
FIG. 5 depicts a network topology of a bridging infrastructure in accordance with an embodiment of the invention.

FIG. 5 depicts a network topology 90 of a bridging infrastructure. The infrastructure supports deploying physical appliances in pairs, whereby each physical appliance will be actively running their respective primary gateway services at runtime, along with hosting its complimentary appliance's standby services in 'standby' mode to ensure maximum utilization of appliance assets. From a networking perspective, both eth0 and eth4 Ethernet interfaces are configured on each appliance for enhanced redundancy of gate services. Eth0 should be used for data plane traffic; Eth4 for a dedicated backchannel link for controller and bootstrap service communications, each of which configured on a different network.

Appliance scenarios include:
1) Steady state—This represents the normal utilization of two physical appliances, whereby the primary services (as defined by the Configuration file XML file) will be consuming and producing messages. Each gateway will have two Q objects associated with it, and there will be two gateways configured on each appliance. Under 'Steady State' the two Q objects for the primary gateways are 'up': the two Q objects for standby gateways are 'down'. Each gateways state should be observed as 'up', regardless if their associated Q object is up or down.
2) Box failure—This represents the failure of an entire appliance. If a first appliance fails, the second appliances standby services are activated, whereby after a slight delay, message consumption/production will continue on the affected queues without message loss and sequencing issues.
3) Box Recovery—Upon an appliance going offline, the appliance should be brought back online via the bootstrap service, which will recalibrate all gateway services such that a balanced steady state is achieved.
4) Primary Service Failure—While in steady state, one of the primary gateway service's Q objects fail. Similar to the box failure scenario, the standby service for the failed primary service running on the complimentary appliance should be automatically enabled, picking up where the failed primary service left off.

It is understood that the bridging infrastructure described herein may be implemented using any type of computing device (i.e., computer system). Such a computing device generally includes a processor, input/output (I/O), memory, and bus. The processor may comprise a single processing unit, or be distributed across one or more processing units in one or more locations, e.g., on a client and server. Memory may comprise any known type of data storage, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing device and likewise may comprise any known type of transmission link, including electrical, optical, wireless, etc. Although not shown, additional components, such as cache memory, communication systems, system software, etc., may be incorporated.

Access may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods.

It should be appreciated that the teachings of the present invention could be offered as a business method on a subscription or fee basis. For example, a bridging infrastructure could be created, maintained and/or deployed by a service provider that offers the functions described herein for customers. That is, a service provider could offer to deploy or provide the ability to provide message bridging as described above.

It is understood that in addition to being implemented as a system and method, the features may be provided as one or more program products stored on a computer-readable storage medium, which when run, enables a computer system to provide some or all of the features described herein. To this extent, the computer-readable storage medium may include program code, which implements the processes and systems described herein. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component", "subsystem" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A bridging infrastructure for bridging message flows between two messaging systems, comprising:
    a current appliance, comprising:
        a first primary gateway configured for communicating a first message flow; and
        a first standby gateway configured for communicating a second message flow, wherein the first standby gateway is implemented in a standby mode during normal operations;
    a complimentary appliance, comprising:
        a second primary gateway configured for communicating the second message flow; and
        a second standby gateway configured for communicating the first message flow, wherein the second standby gateway is implemented in a standby mode during normal operations;
    wherein both the current appliance and the complimentary appliance include a controller service that monitors the operation of each other; and
    wherein upon a detected failure of the complimentary appliance by the current appliance, the controller service on the current appliance causes the second message flow on the primary gateway of the complimentary appliance to be redirected through the standby gateway of the current appliance.

2. The bridging infrastructure of claim 1, further comprising a bootstrap service for rebooting the complimentary appliance from the current appliance.

3. The bridging infrastructure of claim 1, wherein the controller service of the current appliance monitors the first primary gateway and first standby gateway for failures.

4. The bridging infrastructure of claim 1, wherein the controller service on each appliance operates in a separate domain from a processing of the message flows.

5. The bridging infrastructure of claim 1, further comprising an XML configuration file for configuring each appliance.

6. The bridging infrastructure of claim 1, further comprising a logging system for recording failover activities.

7. The bridging infrastructure of claim 1, wherein monitoring operations are implemented using objects scoped at a "Q" object level.

8. An appliance for bridging message flows between two messaging systems, comprising:
    a first primary gateway configured for communicating a first message flow;
    a standby gateway configured for communicating a second message flow, wherein the standby gateway is placed in a standby mode during normal operations; and
    a controller service that monitors a complimentary appliance having a second primary gateway for communicating the second message flow, wherein upon a detected failure of the complimentary appliance, the controller service causes the second message flow to be redirected through the standby gateway.

9. The appliance of claim 8, further comprising a bootstrap service for rebooting the complimentary appliance.

10. The appliance of claim 8, wherein the controller service monitors the first primary gateway and standby gateway for failures.

11. The appliance of claim 8, wherein the controller service on operates in a separate domain from a processing of the message flows.

12. The appliance of claim 11, wherein monitoring operations are implemented using objects scoped at a "Q" object level.

13. The appliance of claim 8, further comprising an XML configuration file for configuring the appliance.

14. The appliance of claim 8, further comprising a logging system for recording failover activities.

15. A method for bridging message flows between two messaging systems, comprising:
    providing a pair of appliances, wherein:
        a current appliance includes a primary gateway configured for communicating a first message flow, and includes a standby gateway set in a standby mode for communicating a second message flow; and
        a complimentary appliance includes a primary gateway configured for communicating the second message flow, and includes a standby gateway set in a standby mode for communicating the first message flow;

monitoring an operation of the complimentary appliance from the current appliance;

upon a detected failure, routing a message flow from the primary gateway of the complimentary appliance to the standby gateway of the current appliance.

16. The method of claim 15, further comprising rebooting the complimentary appliance.

17. The method of claim 15, wherein the monitoring operates in a separate domain from a processing of the message flows.

18. The method of claim 15, wherein monitoring operations are implemented using objects scoped at a "Q" object level.

19. A computer readable non-transitory storage medium having a program product embodied thereon, which when executed by a first computer system, bridges message flows between two messaging systems, comprising program code for:

providing a first primary gateway configured for communicating a first message flow;

providing a standby gateway configured for communicating a second message flow, wherein the standby gateway is placed in a standby mode during normal operations; and monitoring a complimentary computer system having a second primary gateway for communicating the second message flow, wherein upon a detected failure of the complimentary appliance, the monitoring causing the second message flow to be redirected through the standby gateway.

20. The computer readable non-transitory storage medium of claim 19, further comprising program code for rebooting the complimentary appliance.

* * * * *